United States Patent [19]

Bota et al.

[11] Patent Number: 5,211,081

[45] Date of Patent: May 18, 1993

[54] CONTROL SYSTEM FOR AUTOMATIC TRANSMISSION

[75] Inventors: Keiji Bota; Hidehiko Mishima; Hiroto Kawano; Takuro Shigemura; Toshihisa Marusue; Kotaro Ninomiya, all of Hiroshima, Japan

[73] Assignee: Mazda Motor Corporation, Hiroshima, Japan

[21] Appl. No.: 812,814

[22] Filed: Dec. 24, 1991

[30] Foreign Application Priority Data

Dec. 30, 1990 [JP] Japan .................................. 2-417305

[51] Int. Cl.$^5$ .............................................. B60K 41/18
[52] U.S. Cl. .................................... 74/866; 364/424.1
[58] Field of Search ........................ 74/866; 364/424.1

[56] References Cited

U.S. PATENT DOCUMENTS

| | | | |
|---|---|---|---|
| 4,690,017 | 9/1987 | Taniguchi et al. | 74/866 |
| 4,858,500 | 8/1989 | Harada et al. | 74/866 |
| 4,967,355 | 10/1990 | Iwatsuki et al. | 74/866 X |
| 4,991,099 | 2/1991 | Markyvech et al. | 74/866 X |
| 5,089,965 | 2/1992 | Braun | 74/866 X |
| 5,109,731 | 5/1992 | Iwatsuki et al. | 74/866 |

FOREIGN PATENT DOCUMENTS 62-4950 1/1987 Japan .

Primary Examiner—Leslie A. Braun
Assistant Examiner—Daniel Wittels
Attorney, Agent, or Firm—Keck, Mahin & Cate

[57] ABSTRACT

A control system for an automatic transmission including a main transmission and a subtransmission whose shift operation is carried out by hydraulically. The control system comprises a first device for adjusting a gear ratio advance of the main transmission, the gear ratio advance corresponding to a gear ratio change during the shift operation, a second device for adjusting a gear ratio advance of the subtransmission, the gear ratio advance corresponding to a gear ratio change during the shift operation, and a device for controlling the frist adjusting device and the second adjusting device during concurrent shift operations of the main transmission and the subtransmission so that the gear ratio advances of the main transmission and the subtransmission become equal to respective predetermined target gear ratio advances.

10 Claims, 9 Drawing Sheets

CONTROL SYSTEM FOR AUTOMATIC TRANSMISSION

BACKGROUND OF THE INVENTION

1. Field of the Invention

The present invention relates to a control system for an automatic transmission, and in particular to a control system for an automatic transmission which includes a combination of a main transmission and a subtransmission.

2. Description of the Prior Art

There is known an automatic transmission which combines a main transmission and a subtransmission for establishing a larger number of gear ratios. As shown in Japanese Patent Laid-Open Publication No. 62-4950, the conventional automatic transmission of this type starts the operation of changing the gear ratio in the main transmission earlier than that in the subtransmission and synchronizes the main transmission and the subtransmission at the end of the operation of changing the gear ratio, thereby preventing occurrence of shocks during the operation.

The conventional automatic transmission including the conbination of a main transmission and a subtransmission is nevertheless apt to produce shocks in the transition region of the operation of changing gear ratios. It is thus important to match the operation of the main transmission with that of the subtransmission as a whole, because shocks are produced when one of the transmissions is operated earlier than the other.

SUMMARY OF THE INVENTION

It is therefore an object of the present invention to provide a control system for an automatic transmission which is able to prevent the occurrence of shocks in the transition region.

The above object is achieved according to the present invention by providing a control system for an automatic transmission including a main transmission and a subtransmission whose shift operation is carried out hydraulically, said control system comprising, first means for adjusting a gear ratio advance of the main transmission, said gear ratio advance corresponding to a gear ratio change during the shift operation, second means for adjusting a gear ratio advance of the subtransmission, said gear ratio advance corresponding to a gear ratio change during the shift operation, and means for controlling said frist adjusting means and said second adjusting means during concurrent shift operations of the main transmission and the subtransmission so that the gear ratio advances of the main transmission and the subtransmission become equal to respective predetermined target gear ratio advances.

Preferably, the gear ratio advance of whichever of the main transmission and the subtransmission has the larger rate of the gear ratio advance in an initial part of the shift operation of the main transmission and the subtransmission is made larger than that of the other.

Accordint to the present invention, because the gear ratio advances of the main transmission and the subtransmission are controlled so as to provide appropriate changes of the gear ratios of both in the transient region of the shift operation, it is possible to prevent the shift operation from producing shocks in the transient region.

Further objects, features and advantages of the present invention will become apparent from the Detailed Description of Preferred Embodiments which follows when read in light of the accompanying Figures.

DETAILED DESCRIPTION OF THE PREFERRED EMBODIMENTS

The present invention will now be explained with reference to the preferred embodiments and the drawings.

Figure 1:
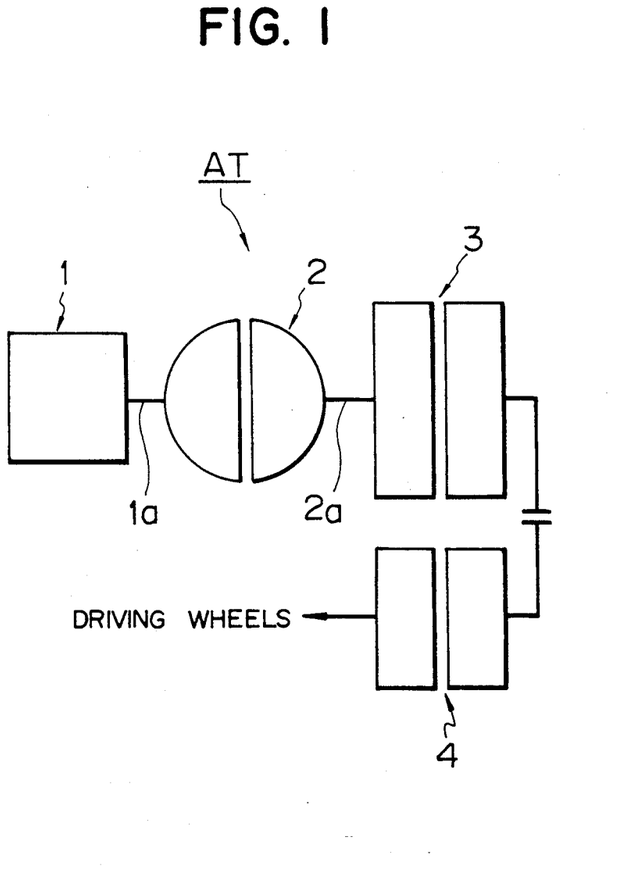
FIG. 1 is a schematic view showing a drive unit of a vehicle.

As is seen in FIG. 1, the output of an engine 1 is transmitted to driving wheels through an automatic transmission AT. The automatic transmission AT includes a torque convertor 2, a main transmission 3 and a subtransmission 4.

Figure 2:
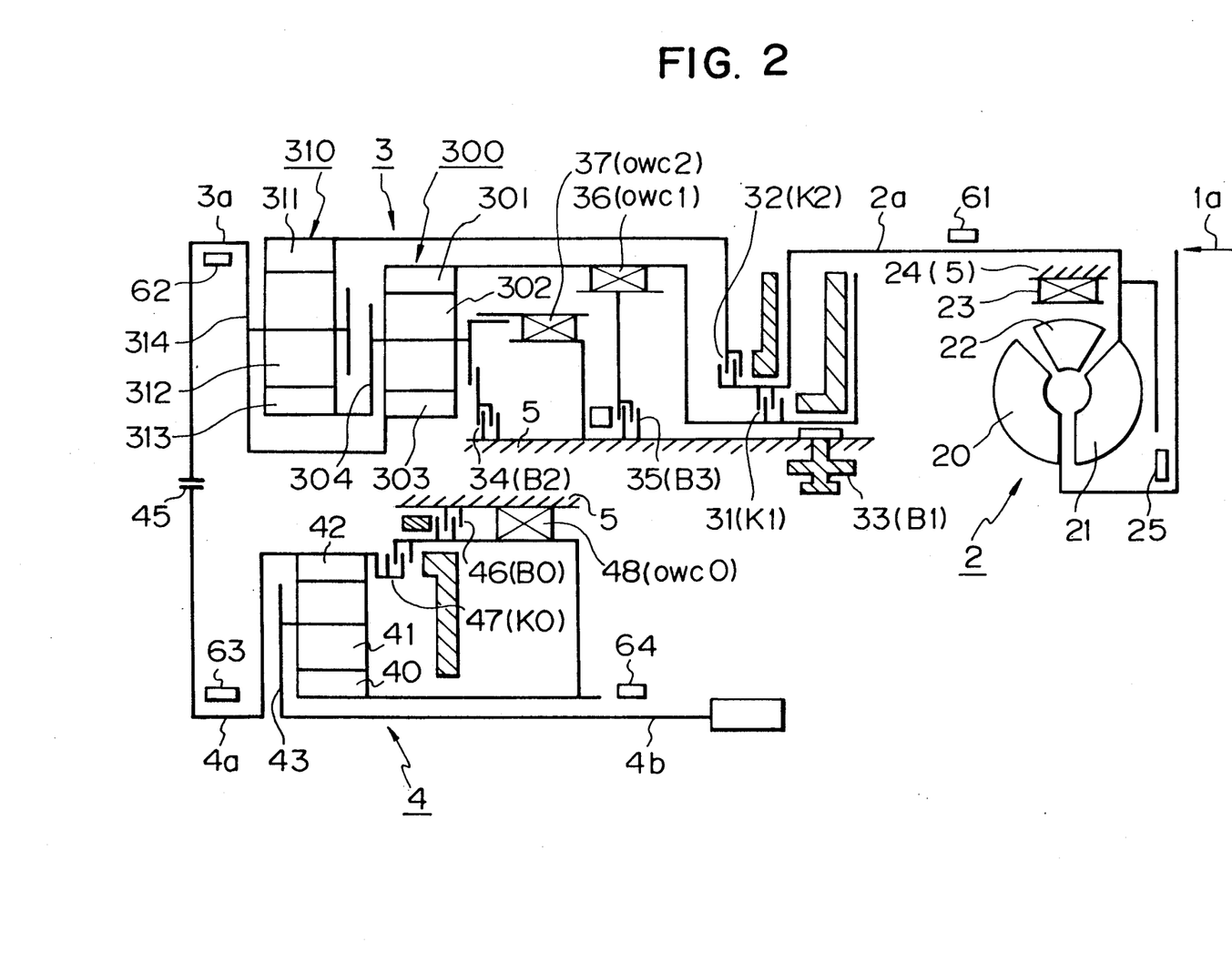
FIG. 2 is a skeleton view showing the contstruction of the automatic transmission.

Referring to FIG. 2, the torque convertor 2 is provided with a pump 20 connected to an engine output shaft 1a, a turbine 21 disposed facing the pump 20, and a stator 22 disposed between he pump 20 and the turbine 21. The stator 22 rotates on a stationary shaft 24 integrated with a case 5 of the automatic transmission AT through a one-way clutch 23. The one-way clutch 23 permits the stator 22 to rotate in the same direction as the pump 20 and prevents it from rotating in the opposite direction. To the turbine 21 is connected a convertor output shaft 2a. Between the convertor output shaft 2a and the pump 20 is disposed a lock-up clutch 25 for directly engaging the engine output shaft 1a with the convertor output shaft 2a. The lock-up clutch 25 is constantly biased in the lock-up direction by the pressure of oil circulating in the torque convertor 2. However, when release oil pressure is supplied from the ontside, the draining of this release oil pressure holds the lock-up clutch 25 in the released state, whereby the engine output shaft 1ais directly engaged with the convertor output shaft 2a.

The main transmission 3 includes a front stage planetary gearset 300 and a rear stage planetary gearset 310.

The front stage planetary gearset 300 includes three gear elements a sun gear 301, a pinion gear 302 and a ring gear 303, and a planet carrier 304. The rear stage planetary gearset 310 includes three gear elements s sun gear 311, a pinion gear 312 and a ring gear 313, and a planet carrier 314. The carrier 304 of the front stage planetary gearset 300 meshes with the sun gear 311 of the rear stage planetary gearset 310, and the sun gear 301 of the front stage planetary gearset 300 meshes with the carrier 314 of the rear stage planetary gearset 310. The carrier 314 is connected with an output shaft 3a of the main transmission 3.

The convertor output shaft 2a is connected with the ring gear 303 of the front stage planetary gearset 300 through a first clutch 31 (K1) and is connected with the ring gear 313 of the rear stage planetary gearset 310 through a second clutch 32 (K2). The main transmission 3 is provided with three brakes fixed to the case 5, namely a first brake 33 (B1), a second brake 34 (B2) and a third brake 35 (B3). Switching of these frictional elements (i.e. the brakes 33, 34, 35, and the clutches 31, 32) enables the main transmission 3 to provide three forward gear speeds and one reverse gear speed. Reference numerals 36, 37 in FIG. 2 designate one-way clutches (owc1, owc2).

The subtransmission 4 includes three gear elements a sun gear 40, a pinion gear 41 and a ring gear 42, and a planet carrier 43 in which the ring gear 42 is connected with the input shaft 4a of the subtransmission 4. The input shaft 4a of the subtransmission 4 is connected with the output shaft 3a of the main transmission 3 through a gear 45, and the carrier 43 is connected with the output shaft 4b of the subtransmission 4. The subtransmission 4 is provided with a brake 46 (B0) fixed to the case 5, and the sun gear 40 meshes with the ring gear 42 through the brake 46 and a clutch 47 (K0). Switching of the frictional elements 46, 47 enables the subtransmission 4 to provide a high speed and a low speed. Reference numeral 48 in FIG. 2 designates an one-way clutche (owc0).

In the illustrated embodiment, switching of the abovementioned brakes 33, 34 35 and the clutches 31, 32, 47 provides the automatic transmission AT with five gear speeds in the forward direction.

Table 1 shows the relationship between the gear speed and the switching operations of the frictional elements 33, 34 35, 31, 32 and 47. In Table 1, (○) means that the corresponding element transmits torque when it is used as a driving element.

TABLE 1

|     | K0 | K1 | K2 | B0 | B1  | B2  | B3  | OWC0 | OWC1 | OWC2 |
|-----|----|----|----|----|-----|-----|-----|------|------|------|
| 1st |    |    | ○  |    |     | (○) |     | ○    |      | ○    |
| 2nd | ○  |    | ○  |    |     | (○) |     |      |      | ○    |
| 3rd |    |    | ○  | ○  | (○) |     |     | ○    | ○    |      |
| 4th |    | ○  | ○  | ○  |     |     |     | ○    | ○    |      |
| 5th | ○  | ○  | ○  |    |     |     | ○   |      |      |      |

Table 2 shows the relationship between the gear speeds of the automatic transmission AT, the gear speeds of the main transmission 3 and the subtransmission 4, ad the gear ratios.

TABLE 2

| GEAR SPEED | | GEAR RATIO | | |
|---|---|---|---|---|
| MAIN Transmission | SUB-Transmission | MAIN Transmission | SUB-Transmission | FINAL GEAR RATIO |
| 1st | 1st | Low | 2.9 | 1.5 | 4.35 |

TABLE 2-continued

| GEAR SPEED | | GEAR RATIO | | |
|---|---|---|---|---|
| MAIN Transmission | SUB-Transmission | MAIN Transmission | SUB-Transmission | FINAL GEAR RATIO |
| 2nd | 1st | High | 2.9 | 1.0 | 2.9 |
| 3rd | 2nd | Low | 1.4 | 1.5 | 2.1 |
| 4th | 3rd | Low | 1.0 | 1.5 | 1.5 |
| 5th | 3rd | High | 1.0 | 1.0 | 1.0 |

The automatic transmission AT is provided with a known oil hydraulic circuit which includes a manually operated selector valve. The selector valve includes positions 1, 2, D, N, R and P which are switched between for changing the line for supplying line pressure.

Figure 3:
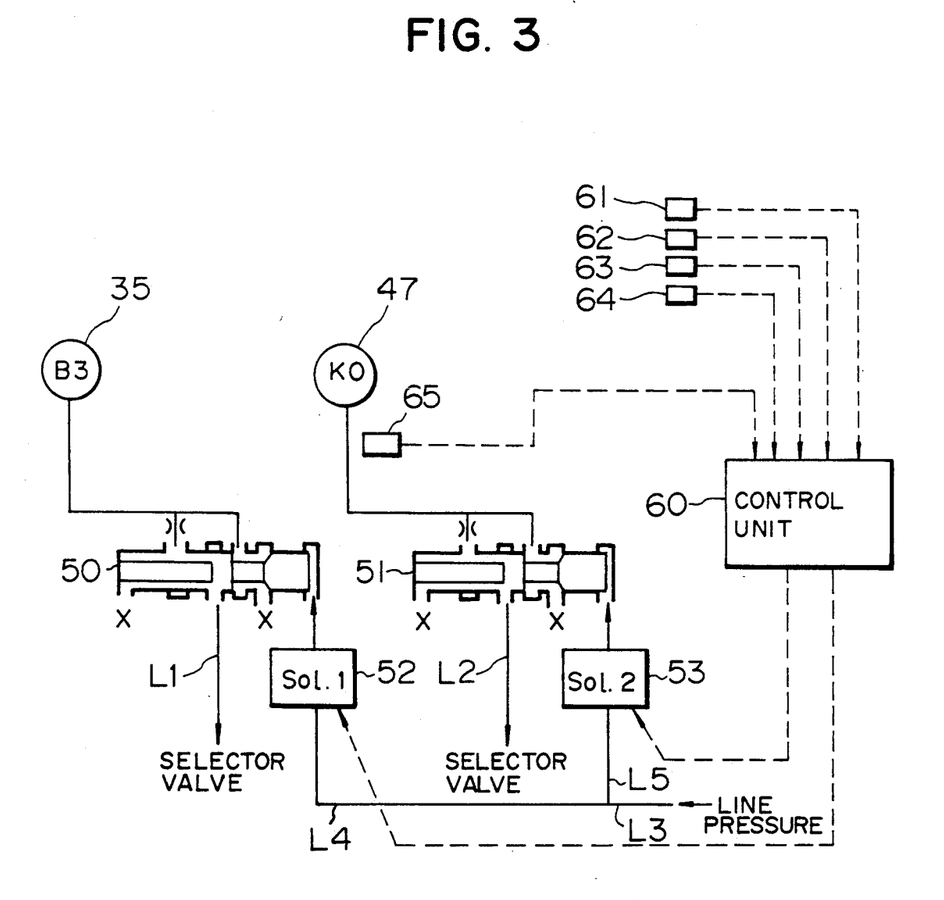
FIG. 3 is a schematic view of a hydraulic circuit incorporated into the automatic transmission.

FIG. 3 shows a portion of the hydraulic pressure circuit of the automatic transmission AT, which has with a first shift valve 50 for the third brake 35 and a second shift valve 51 for the brake 47. The first shift valve 50 is provided on a line L1 which connects the selector valve with the third brake 35 (B3). The second shift valve 51 is provided on a line L2 which connects the selector valve with the clutch 47 (K0). The circuit is provided with a pilot line L3 which branches into a first branch line L4 and a second branch line L5. Further, the first branch line L4 is connected with the first shift valve 50 and the second branch line L5 is connected with the second shift valve 51. These branch lines L4 and L5 are provided respectively with linear solenoid valves 52, 53 which are operated so as to control the amount of the oil pressure supplied to or drained from the third brake 35 and the clutch 47.

The automatic transmission AT is operated by a control unit 60 which incorporates a microcomputer. The control unit 60 is input with various information necessary for upshift operations and downshift operations. The control unit 60 outputs the upshift and downshift signals to the solenoid valves 52, 53 and the like in accordance with upshift and downshift lines on a map predetermined on the basis of the vehicle speeds and engine load. The upshift and downshift operations of the automatic transmission AT are well known and therefore, will not be explained further here.

The control unit 60 receives signals from sensors 61–65. The sensor 61 detects the speed of the convertor output shaft 2a, the sensor 62 detects the speed of the output shaft 3a of the main transmission 3, the sensor 63 detects the speed of the input shaft 4a of the subtransmission 4, and the sensor 64 detects the speed of the output shaft 4b of the subtransmission 4. The sensor 65 detects the operating hydraulic pressure in the clutch 47 (K0).

The upshift operation for shifting from the 2nd gear speed (2nd) to the 3rd gear speed (3rd) will now be explained as an example of the upshift and downshift operations conducted by the control unit 60. As will be understood from FIG. 3, the upshift operation for shifting the 2nd gear speed to the 3rd gear speed is carried out by disengaging the clutch 47 (K0) of the subtransmission 4 and engaging the third brake 35 (B3) of the main transmission 3. When the upshift operation for shifting from the 2nd gear speed to the 3rd gear speed is carried out, the main transmission 3 is changed to a higher speed and the subtransmission 4 is changed to a low speed.

Next, referring to FIG. 4, the control operation for the frictional elements 35, 47 at the time of shifting from the 2nd gear speed to the 3rd gear speed will be explained.

The control operation is carried out during the shift operation region T which consists of an initial region $t_1$, an intermediate region $t_3$ and a final region $t_2$, in such a manner that the acceleration of the vehicle body becomes flat and the occurrence of shocks caused during the shift operation is prevented. In particular, the present invention prevents the occurrence of shocks caused during the intermediate region $t_3$.

First, the upshift operation for shifting from the 2nd gear speed to the 3rd gear speed is carried out by a combination of upshift in the main transmission 3 and downshift in the subtransmission 4. The third brake 35 is engaged by supplying hydraulic pressure in the upshift operation in the main transmission 3, and the clutch 47 is disengaged by draining hydraulic pressure in the downshift operation in the subtransmission 4. The supply of hydraulic pressure is generally easier to control with high precision than the draining of hydraulic pressure. Further, at the time of shift from the 2nd gear speed to the 3rd gear speed in the automatic transmission AT, the main transmission 3 also takes the same upshift. Based on these considerations, in the present invention, the shift operation of the main transmission 3 is started earlier than that of the subtransmission 4. That is, the first solenoid 52 is controlled first to actuate the third brake 35 based on the shift command.

INITIAL REGION $T_1$

Figure 4:
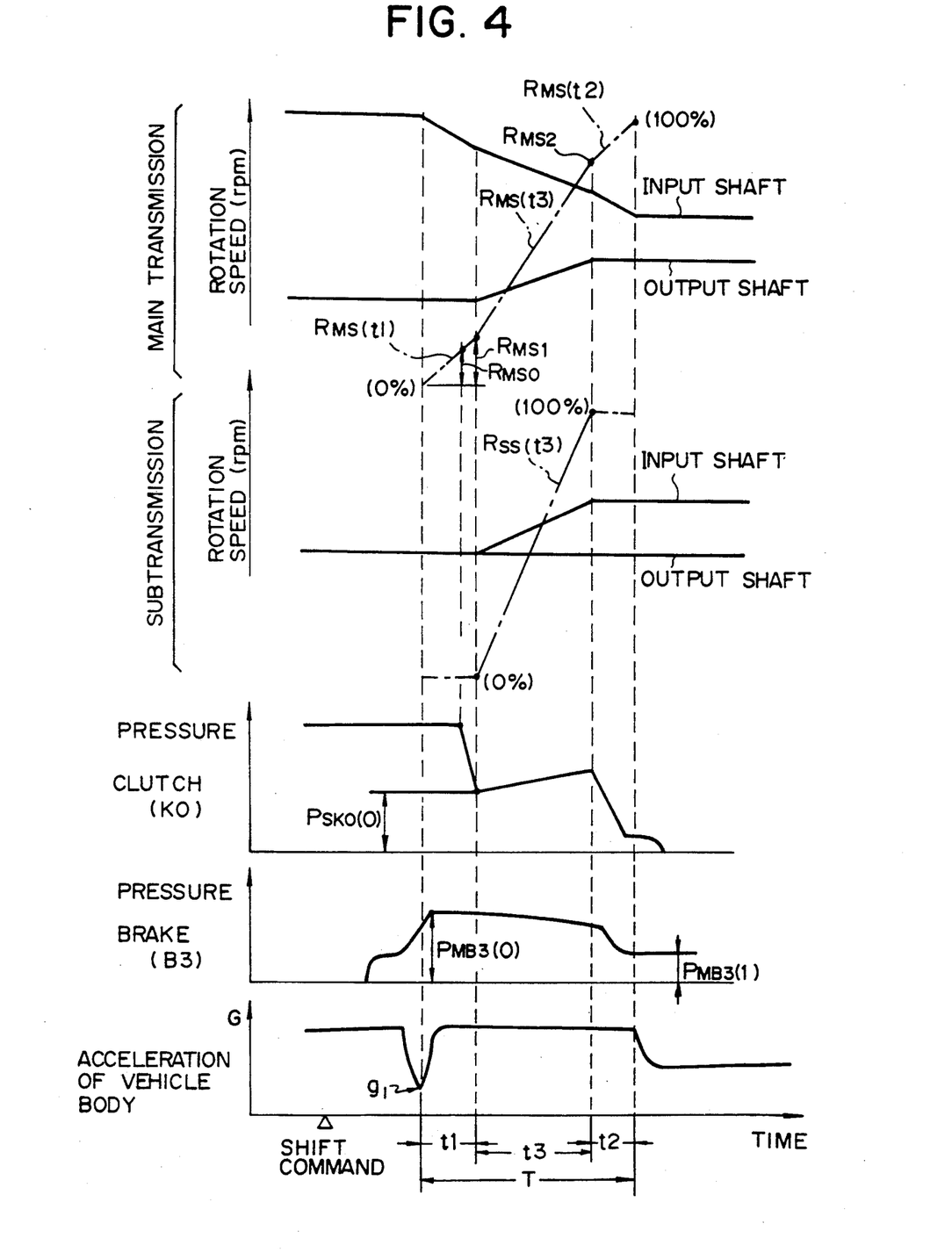
FIG. 4 is a graphical representation showing a control operation carried, out by an embodiment of the present invention.

The initial region $t_1$ starts at the point of detection of a drop $g_1$ in the acceleration of the vehicle body caused by the initiation of the third brake 35 engagement (see FIG. 4). First, a predetermined initial pressure $P_{MB3\,(0)}$ is applied to the third brake 35, and the gear ratio advace of the main transmission 3 is feedback controlled based on a target gear ratio advance $R_{MS\,(t1)}$ to the main transmission 3.

The gear ratio advance is defined as a persentage (%) of the gear ratio in the transient region where the gear ratio ($G_{M2}$) of the main transmission 3 in the 2nd gear speed is defined as 0% and the gear ratio ($G_{M3}$) of the main transmission 3 in the 3rd gear speed is defined as 100%.

Next, when the gear ratio advance is equal to $R_{MS\,0}$ immediately before the end of initial region $t_1$, the shift command is sent to the subtransmission 4. Based on this shift command, the control operation of the solenoid 53 for the clutch 47 is started, and then draining of the hydraulic pressure in the clutch 47 is started. Next, when the gear ratio advance becomes equal to the target gear ratio advance $R_{MS\,1}$ $S_1$ which point of time is defined as the end of the initial region $t_1$, the hydraulic pressure in the clutch 47 is drained to establish a predetermined pressure $P_{SK\,0\,(0)}$ determined based on the driving conditions and which is a pressure at which the disengagement of the clutch 47 is started.

INTERMEDIATE REGION $T_3$

In the intermediate region $t_3$, the gear ratio advance of the main transmission 3 is feedback controlled based on a target gear ratio advance $R_{MS\,(t3)}$. In the intermediate region $t_3$, in addition to controlling the main transmission 3, a target gear ratio advance $R_{SS\,(t3)}$ is set to the subtransmission 4 and the gear ratio advance of the subtransmission 4 is feedback controlled to be equal to this target gear ratio advance $R_{SS\,(t3)}$. The target gear ratio advance $R_{MS\,(t3)}$ of the subtransmission 4 is determined based on the target gear ratio advance $R_{MS\,(t3)}$ of the main transmission 3 so that the acceleration of the vehicle body is maintained constant. The target gear ratio advance $R_{SS\,(t3)}$ of the subtransmission 4 is set to be 0% at the start of the intermediate region $t_3$ and to be 100% at the end of the region $t_3$. The shift operation of the subtransmission 4 is carried out only in the intermediate region $t_3$ and is completed at the end of the region $t_3$.

FINAL REGION $T_2$

In the final region $t_2$, the gear ratio advance of the main transmission 3 is feedback controlled based on a target gear ratio advance $R_{MS\,(t2)}$. The control operation of the main transmission 3 in the final region $t_2$ is necessary because it takes some time after the control operation of the subtransmission 4 is completed in the intermediate region $t_3$ for the hydraulic pressure in the clutch 47 to drain spontaneously the clutch 47 to disengage completely. Therefore, the final region $t_2$ is determined based on the time required for the draining of hydraulic pressure from the clutch 47. The gear ratio advance of the main transmission 3 is controlled so as to reduce the effect of the partial engagement of the clutch 47 on the acceleration of the vehicle body.

After the final region $t_2$, the hydraulic pressure in the third brake 35 is maintained at $P_{MB\,3\,(1)}$.

Figure 5:
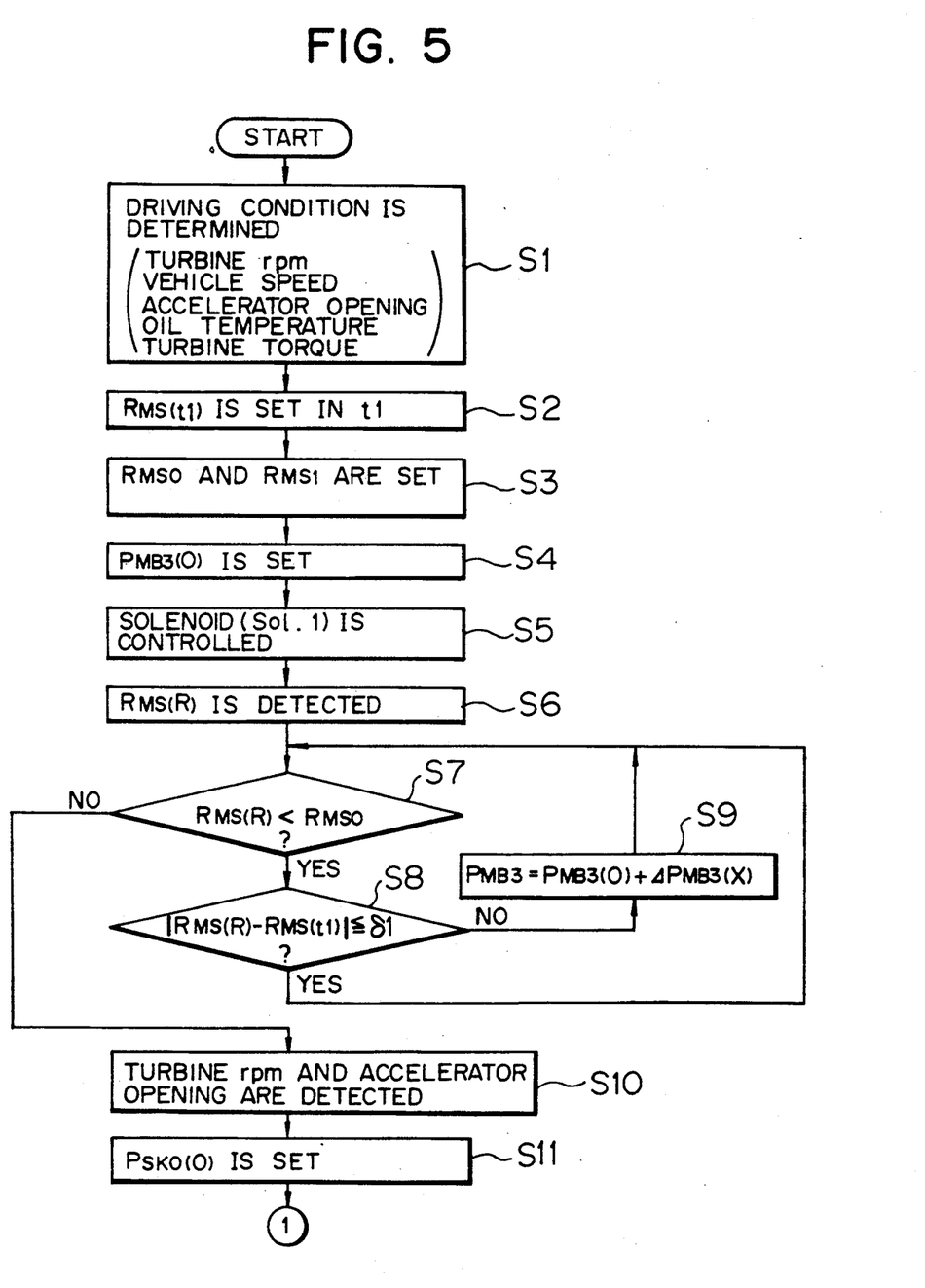
FIGS. 5 and 6 are flow charts showing a control operation carried by an embodiment of the present invention.
Figure 6:
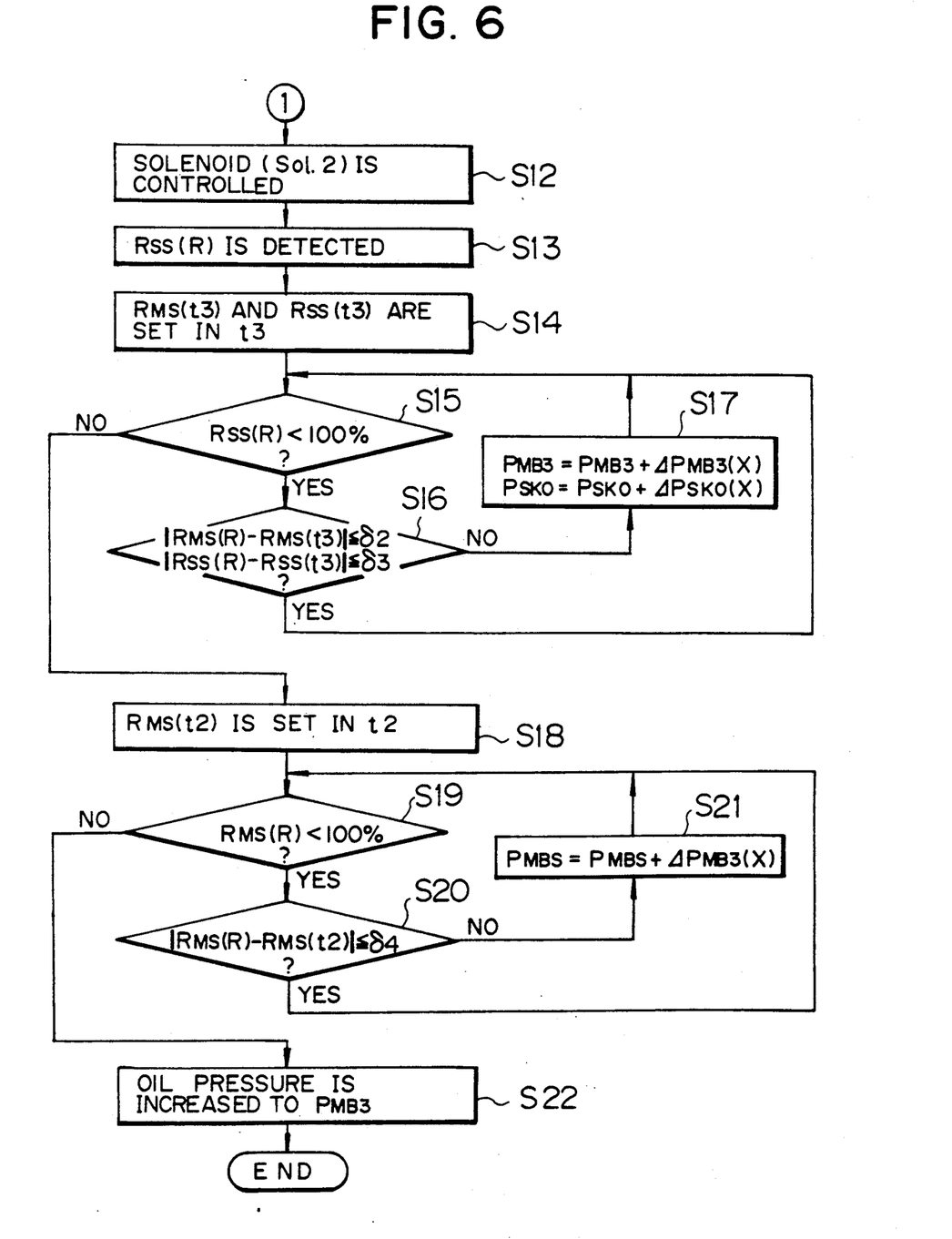

The embodiment of the present invention will now be explained in detail with reference to FIGS. 5 and 6.

First, the driving condition is determined based on the turbine rpm, the vehicle speed, the accelerator opening, the oil temperature, the turbine torque, and the like in step (hereafter identified as S) 1. When the driving condition at the present time crosses over a 2–3 shift line on a shift map, a control signal is first output to the solenoid 52 for the third brake 35 of the main transmission 3. Then, after the drop $g_1$ in the acceleration of the vehicle body is detected, i.e. after the start of the initial region $t_1$, the target gear ratio advance $R_{MS\,(t1)}$ of the main transmission 3 is set in S2.

Next, the abovementioned $R_{MS\,0}$ and $R_{MS\,1}$ (see FIG. 4) are set in S3 and the initial hydraulic pressure $P_{MB\,3}$ (see FIG. 4) for the third brake 35 is set in S4. Then, the control operation of the solenoid 52 (Sol. 1) for the third brake 35 is started in the initial region $t_1$ in S5, whereby degree of the engagement of the third brake 35 is controlled so that the gear ratio advance of the main transmission 3 becomes equal to the target gear ratio advance $R_{MS\,(t1)}$.

The actual gear ratio advance $R_{MS\,(R)}$ of the main transmission 3 is detected in S6. The actual gear ratio advance $R_{MS\,(R)}$ is calculated from the difference between the speeds of the input shaft $2a$ and the output shaft $3a$ of the main transmission 3.

It is determined whether or not the actual gear ratio advance $R_{MS\,(R)}$ is less than the target gear ratio advance $R_{MS\,0}$ in S7. If the answer to S7 is YES, the actual gear ratio advance $R_{MS\,(R)}$ is feedback controlled so as to make it equal to the target gear ratio advance $R_{MS\,(t1)}$, or the hydraulic pressure in the third brake 35 is controlled so that the actual gear ratio advance $R_{MS\,(R)}$ is made equal to the target gear ratio advance $R_{MS\,(t1)}$ in S8 and S9. If the answer to S7 is NO, that is, if the actual gear ratio advance $R_{MS\,(R)}$ is equal to the target gear ratio advance $R_{MS\,(t1)}$, the turbine rpm and the accelerator opening are detected in S10, and then the initial hydraulic pressure $P_{SK\ 0\ (0)}$ in the clutch 47 of the subtransmission 4 is set in S11.

That is, the input torque of the automatic transmission AT is found in S10, and the initial hydraulic pressure $P_{SK\ 0\ (0)}$ is set based on the input torque in S11. Then, the control operation of the solenoid 53 (Sol. 2) for the clutch 47 in the subtransmission 4 is carried out in S12, and the actual gear ratio advance $R_{SS\ (R)}$ of the subtransmission 4 is detected in S13. The actual gear ratio advancej $R_{SS\ (R)}$ is calculated from the difference between the speeds of the input shaft 4a and the output shaft 4b of the subtransmission 4.

Next, the target gear ratio advance $R_{MS\ (t3)}$ of the main transmission 3 and the target gear ratio advance $R_{SS\ (t3)}$ of the subtransmission 4 (see FIG. 4) are set in the intermediate region $t_3$ in S14.

In S15, it is determined whether or not the actual gear ratio advance $R_{SS\ (R)}$ is less than 100% of the target gear ratio advance $R_{SS\ (t3)}$. If the answer to S15 is YES, then until the actual gear ratio advance $R_{SS\ (R)}$ of the subtransmission 4 becomes equal to 100% of the target value, the third brake 35 (the solenoid 52) and the clutch 47 (the solenoid 52) are feedback controlled based on the target gear ratio advance $R_{MS\ (t3)}$ of the main transmission 3 and the target gear ratio advance $R_{SS\ (t3)}$ of the subtransmission 4 in S16 and S17.

If the answer to S15 is NO, that is, if the actual gear ratio advance $R_{SS\ (R)}$ is equal to 100% the control operation in the intermediate region $t_3$ is completed and the operation moves to the final region $t_2$ in S18.

As described above, the control operation of the main transmission 3 in the final region $t_2$ is carried out so as to reduce the effect of the partial engagement of the clutch 47 of the subtransmission 4. First, the target gear ratio advance $R_{MS\ (t2)}$ of the main transmission 3 is set in S18. Next, it is determined whether or not the actual gear ratio advance $R_{MS\ (R)}$ is less than 100% of the target gear ratio advance $R_{MS\ (t2)}$ in S19. If the answer to S19 is YES, then until the real gear ratio advance $R_{MS(R)}$ of the main transmission 3 becomes equal to 100% of the target value, the third brake 35 (the solenoid 52) is feedback controlled based on the target gear ratio advance $R_{MS\ (t2)}$ of the main transmission 3 in S20 and S21. If the answer to S19 is NO, that is, if the actual gear ratio advance $R_{MS\ (R)}$ is equal to 100%, the control operation in the final region $t_2$ is completed. Finally, the hydraulic pressure in the third brake 35 is increased to the line pressure $P_{MB\ 3\ (1)}$ and the control operation of the automatic transmission AT is completed in S22.

Other embodiments of the present invention will now be described with reference to FIGS. 7–11.

Figure 7:
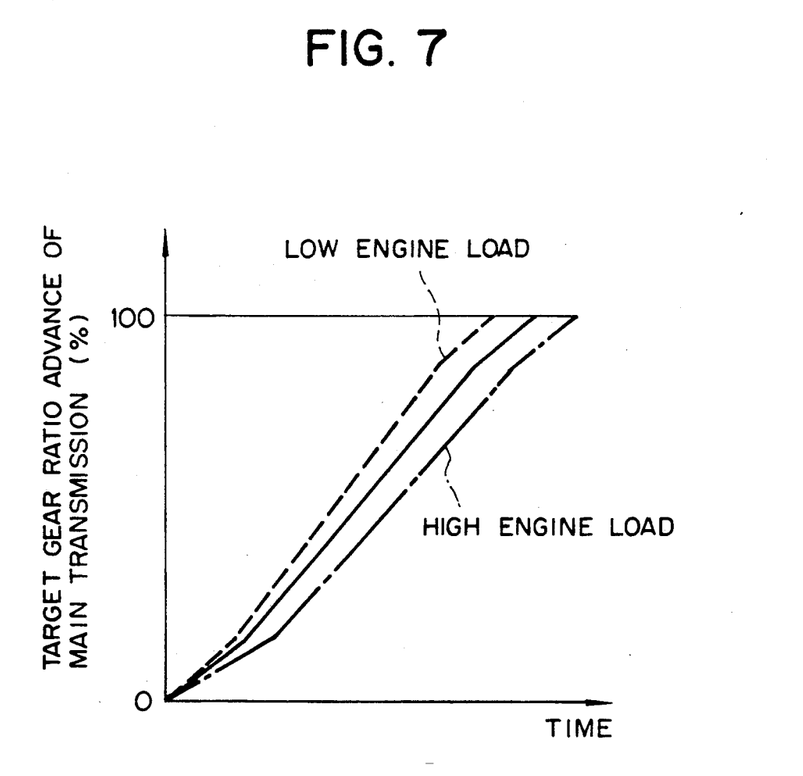
FIG. 7 is a graphical representation showing how the target gear ratio advance adjusted for engine load.

FIG. 7 shows another embodiment in which the target gear ratio advance of the main transmission 3 is adjusted in accordance with engine load. In FIG. 7, the broken line shows the target gear ratio advance under in low engine load and the long-short dash line shows the target gear ratio advance under high engine load. The higher the engine load, the larger is the amount of energy absorbed by the frictional elements consequently, the longer the shift operation becomes. This embodiment is, therefore, able to prevent the large fluctuation of the acceleration of the vehicle body and of the output torque that would therwise occure during the shif operations.

Figure 8:
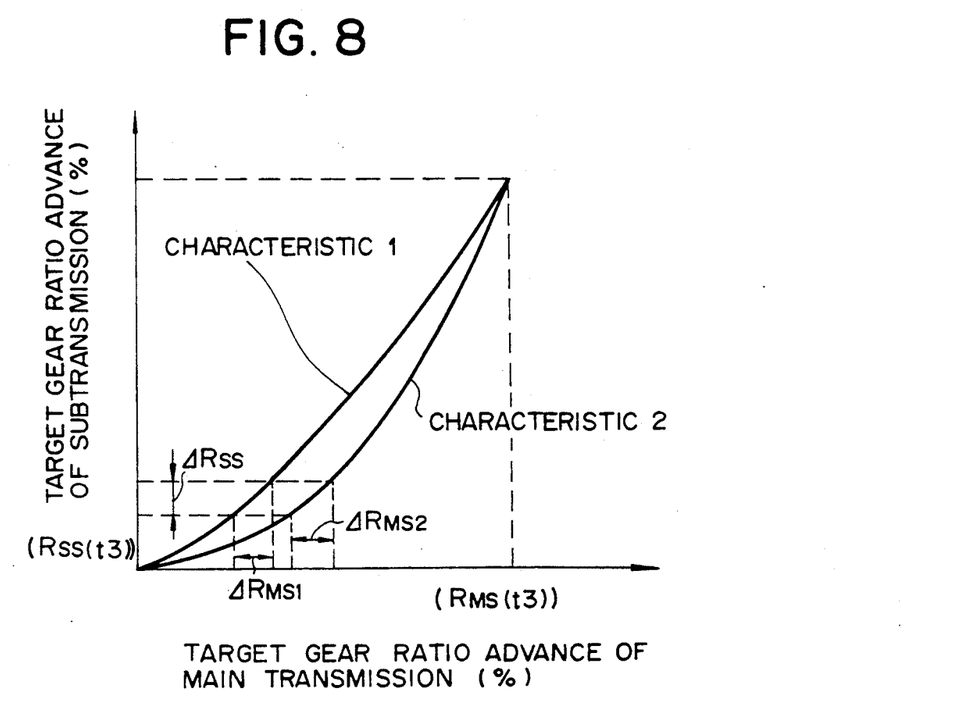
FIG. 8 is a graphical representation showing two characteristics which can be used for the relationship between the target gear ratio advances of the main transmission and the subtransmission.

FIG. 8 shows relationships in the intermediate region $t_3$ between the target gear ratio advance $R_{MS\ (t3)}$ of the main transmission 3 and the target gear ratio advance $R_{SS\ (t3)}$ of the subtransmission 4. Comparing the characteristic 1 with the characteristic 2 in FIG. 8, it will be noted that in the initial part of the intermediate region $t_3$ the characteristic 1 establishes a more rapid rate of change in the gear ratio advance of the subtransmission 4 with respect to the gear ratio advance of the main transmission 3 than does in the characteristic 2. More specifically, the rate of advance $\Delta R_{MS\ 1}$ of the main transmission 3 according to the characteristic 1 is smaller than the rate of advance $\Delta R_{MS\ 2}$ of the main transmission 3 according to the characteristic 2 under the same rate of advance $\Delta R_{SS}$ of the subtransmission 4.

As described above, the third brake 35 in the main transmission 3 is controlled in the direction of engagement, and the clutch 47 in the subtransmission 4 is controlled in the direction of disengagement. Therefore, the main transmission 3 (the third brake 35) absorbs more energy in the shift operation than does the subtransmission 4 (the clutch 47). Therefore, under engine condition where the automatic transmission AT has a large torque input, the target gear ratio advances of the main transmission 3 and the subtransmission 4 are set accordint to the characteristic 1. As a result, the load of the main transmission 3 can be decreased and the reliability of the automatic transmission AT can be improved. Instead of using the characteristics 1 and 2, it is possible to adjust the basic characteristics.

The characteristic 1 is preferably employed in the following cases:

(1) the accelerator opening is large;
(2) the engine torque increases according to a drop in the outdoor temperature;
(3) the vehicle is running at low altitude;
(4) the air conditioner is OFF;
(5) the vehicle is running on high-octane gasoline or the like.

Figure 9:
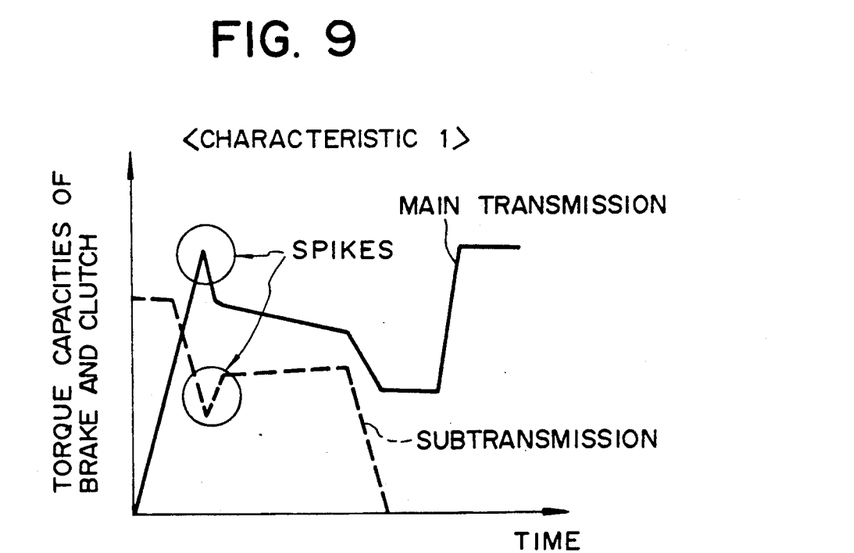
FIG. 9 is a graphical representation showing the torque capacities of the brake and the clutch where the characteristic 1 shown in FIG. 8 is employed.
Figure 10:
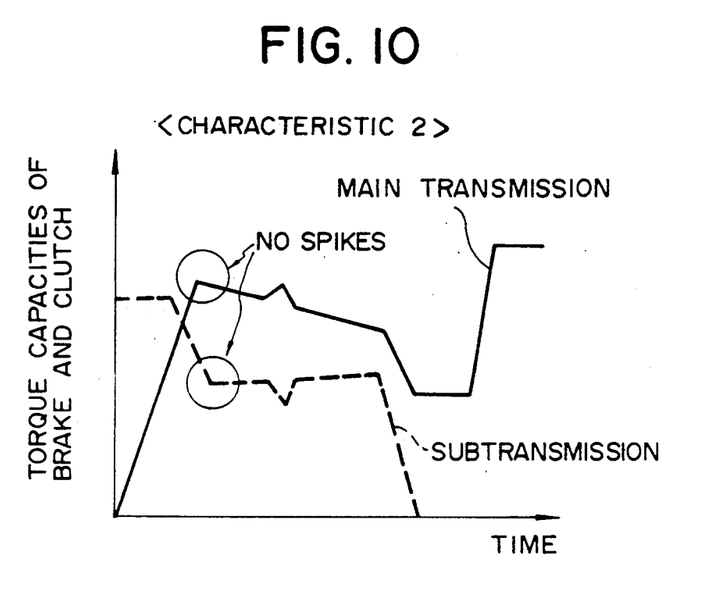
FIG. 10 is a graphical representation showing the torque capacities of the brake and the clutch where the characteristic 2 shown in FIG. 8 is employed.

FIGS. 9 and 10 show the controllability in the oil pressure control operations of the third brake 35 and the clutch 47 respectively.

The shift operation of the main transmission 3 accordint to the characteristic 1 shown in FIG. 8 is delayed in comparison with that accordint to the characteristic 2. On the other hand, when an overall upshift is carried as whole in the automatic transmission AT, upshift is carried out in the main transmission 3 and downshift is carried out in the subtransmission 4. Therefore, in order to prevent shocks from being caused by the shift operation, that is, to keep the acceleration of the vehicle body flat, the shift operation of the main transmission 3 which has the same shift direction as the automatic transmission AT should be carried out earlier than that of the subtransmission 4. As a result, the controllability can be improved.

In other words when the shift operation of the main transmission 3 is delayed by employing the characteristic 1 ($\Delta R_{MS\ 1} < 66\ R_{MS\ 2}$), the shocks are likely to be produced by the downshit operation of the subtransmission 4 in the initial part in the region $t_3$. Therefore, because the shift operation has to be carried out in the initial part in the region $t_3$ using the control characteristics which produces spikes in the main transmission 3 and the subtransmission 4, as shown in FIG. 9, it is difficult to carry out the shift operation.

On the other hand, when the characteristic 2 is used, the shift operation of the main transmission 3 leads. Therefore, as shown in FIG. 10, the shift operation can be easily carried out, because the control characteristics have no such spikes. Adjustment of the basic characteristic may be employed instead of using these control characteristics.

The characteristic 2 is preferably employed in the following cases:
(1) the accelerator opening is small;
(2) the engine torque decreases according to a rise in the outdoor temperature;
(3) the vehicle is running at high altitude;
(4) the air conditioner is ON;
(5) the vehicle is running on regular gasoline or the like.

Figure 11:
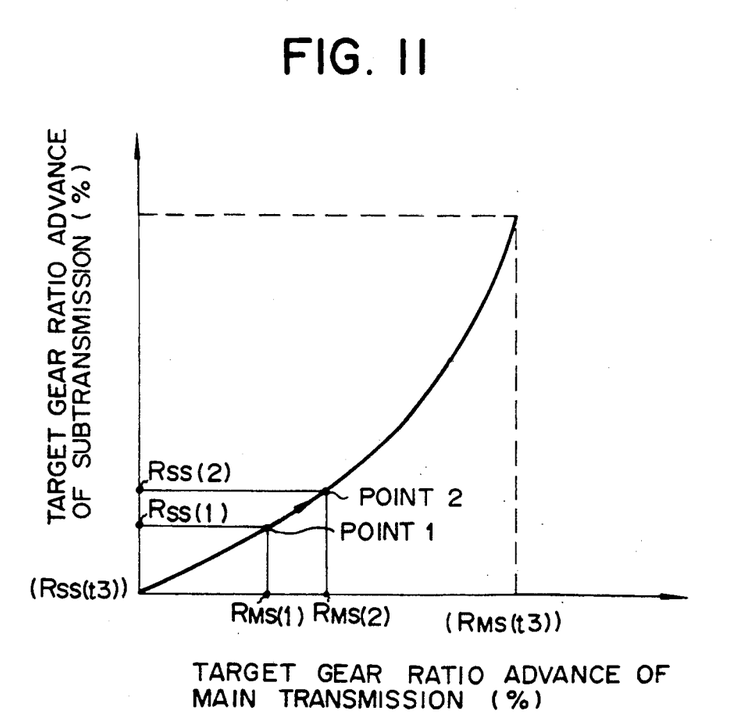
FIG. 11 is a graphical representation for explaining the relationship between the target gear ratio advances of the main transmission and the subtransmission and the ratio of the gear ratios.

FIG. 11 is a graphical representation for explaining the relationship between the target gear ratio advances of the main transmission and the subtransmission and the ratio of the gear ratios.

In an automatic transmission AT with a ratio $\alpha$ of gear ratios which may be "wide" or "close", if the characteristic 1 (see FIG. 8) is employed when the ratio $\alpha$ is "wide" so as to set basic target gear ratio advance of the main transmission and the subtransmission before adjustment for the accelerator opening and the like, the characteristic 2 (see FIG. 8) is preferably employed when the raio $\alpha$ is "close" so as to improve the controllability.

The reasons for this will be explained below. First, the ratio $\alpha$ of the gear ratios is defined as $$\alpha = (G_{M2} \times G_{S2})/(G_{M3} \times G_{S3})$$

where
$G_{M2}$ is the gear ratio of 2nd gear speed in the main transmission,
$G_{M3}$ is the gear ratio of 3nd gear speed in the main transmission;
$G_{S2}$ is the gear ratio of 2nd gear speed in the subtransmission, and
$G_{S3}$ is the gear ratio of 3nd gear speed in the subtransmission.

Now, if $G_{M2} = 2.900$, $G_{M3} = 1.400$, $G_{S2} = 1.000$ and $G_{S3} = 1.500$ (hereinafter called the "first case"), $\alpha_1 = 1.38$ in the first case. On the other hand, if $G_{M2} = 3.000$, $G_{M3} = 1.400$, $G_{S2} = 1.000$ and $G_{S3} = 1.400$ (hereinafter called the "second case"), $\alpha_2 = 1.53$ in the second case.

When the first case is compared with the second case, it is seen that $\alpha_1 < \alpha_2$. Therefore, an automatic transmission AT in line with the first case is said to have a "close" $\alpha$ and an automatic transmission AT in line with the secont case is said to have a "wide" $\alpha$.

The above equation defining the ratio a of the gear ratios can be transformed as follows.

$$\alpha = (G_{M2}/G_{M3}) \times (G_{S2}/G_{S3}) = A \times B$$

where
$A = (G_{M2}/G_{M3})$ is the ratio between the gear ratio of the 2nd gear speed and the gear ratio of the 3rd gear speed in the main transmission, and
$B = (G_{S2}/G_{S3})$ is the ratio between the gear ratio of the 2nd gear speed and the gear ratio of the 3rd gear speed in the subtransmission.

Now, if an overall upshift operation is carried out in the automaic transmission AT by conducting the upshift operation in the main transmission 3 and the downshift operation in the subtransmission 4, it will be understood that $A > 1$, $B < 1$ and $A > (1/B)$.

Therefore, the following cases can be employed for setting a "wide" ratio $\alpha$ of gear ratios.
(1) Both A and B are increased (as in cases 1 and 2),
(2) A is increased and B is held constant,
(3) A is held costant and B is increased,
(4) A is increased and B is decreased where $A \times B > 1$, and
(5) A is decreased and B is increased where $A \times B > 1$.

Now suppose that a common target gear ratio advance degree as shown in FIG. 11 is applied to an automatic transmission AT accordint to the first case and an automatic transmission AT accordint to the second case.

The target gear ratio advances $R_{MS(1)}$, $R_{SS(1)}$ at point 1 in FIG. 11 can be shown as follows:

$$R_{MS(1)} = \{(G_{M(1)} - G_{M2})/(G_{M3} - G_{M2})\} \times 100$$

$$R_{SS(1)} = \{(G_{S(1)} - G_{S2})/(G_{S3} - G_{S2})\} \times 100$$

where
$G_{M(1)}$ is the gear ratio of the main transmission 3 at point 1, and
$G_{S(1)}$ is a gear ratio of the subtransmission 4 at point 1.

The target gear ratio advances $R_{MS(2)}$, $R_{SS(2)}$ at point 2 in FIG. 1 can be shown as follows:

$$R_{MS(2)} = \{(G_{M(2)} - G_{M2})/(G_{M3} - G_{M2})\} \times 100$$

$$R_{SS(2)} = \{(G_{S(2)} - G_{S2})/(G_{S3} - G_{S2})\} \times 100$$

where
$G_{M(2)}$ is the gear ratio of the main transmission 3 at point 2, and
$G_{S(2)}$ is the gear ratio of the subtransmission 4 at point 2.

Here supposing that the shift operation proceeds from the point 1 to the point 2, the rate of change in the advance $\Delta x$ can be expressed as follows:

$$\Delta x = \}R_{SS(2)} - R_{SS(1)}\}/\{R_{MS(2)} - R_{MS(1)}\}$$

Substituting the above equations in this equation, $$\Delta x = \{(G_{S3} - G_{S2})/(G_{M3} - G_{M2})\} \times \{(G_{M(2)} - G_{M(1)})/(G_{S(2)} - G_{S(1)})\}$$

As a result, we obtain $$\Delta x = k \times (\Delta G_M / \Delta G_S)$$

where
$k = (G_{S3} - G_{S2})/(G_{M3} - G_{M2})$, $\Delta G_M = (G_{M(2)} - G_{M(1)})$, and $\Delta G_S = G_{S(2)} - G_{S(1)})$.

Where the values in the first case are substituted in this equation, we obtain $|k| = 0.33$. Similarly, when the values in the second case are substituted in this equation, we will obtain $|k| = 0.25$. From this, it will be understood that the wider the ratio $\alpha$ of the gear ratios is, the smaller $|k|$ generally is.

Here, since the same target gear ratio advance is applied to the first case and the second case, $\Delta x$ is identical.

Therefore, we obtain $$|k \times (\Delta G_M / \Delta G_S)|_{(1)} = |k \times (\Delta G_M / \Delta G_S)|_{(2)}$$

where the subscript $(1)$ means the first case and the subscript $(2)$ means the second case.

Because $|k|_{(1)} > |k|_{(2)}$ as explained above, it follows that $$|\Delta G_M/\Delta G_S|_{(1)} < |\Delta G_M/\Delta G_S|_{(2)}$$

From the above explanation, it will be understood that where the same target gear ratio advance is applied to the automatic transmission AT a with "wide" $\alpha$ and the automatic transmission AT with a "close" $\alpha$, a difference will generally arise in the rate of change ($\Delta G_M \Delta G_S$) in the gear ratios of the main transmission and the subtransmission. The difference is larger in the automatic transmission AT with the "wide" $\alpha$ than that with the "close" $\alpha$. In other words the rate of change in the gear ratio of the main transmission is larger in the automatic transmission AT with the "wide" $\alpha$ than that with the "close" $\alpha$, where the rate of change in the gear ratios of the subtransmission with the "wide" $\alpha$ is as same as that the "close" $\alpha$.

This relationship is identical to that of the switching between the characteristic 1 and the characteristic 2 shown in FIG. 8. Therefore, good controllability can be obtained in the automatic transmission AT with a "wide" $\alpha$. The characteristic 2 should be employed in the automatic transmission AT with a "close" $\alpha$ so as to improve the controllability. In the same automatic transmission AT, the characteristic 1 may be employed where the ratio $\alpha$ of the gear ratios is "wide", and the characteristic 2 may be employed where the ratio $\alpha$ of the gear ratios is "close". Adjusted characteristic may be employed instead of the charasteristics 1 and 2.

According to the present invention, because the gear ratio advances of the main transmission and the subtransmission are controlled so as to ensure appropriate change of the gear ratios of both in the transient region of the shif operation, shocks are prevented from occuring in the transient region of the shift operation.

Although the present invention has been explained with reference to a specific, preferred embodiment, one of ordinary skill in the art will recognize that modifications and improvements can be made while remaining within the scope and spirit of the present invention. The scope of the present invention is determined solely by appended claims.

What is claimed is:

1. A control system for an automatic transmission including a main transmission and a subtransmission whose shift operation is carried out hydraulically, said control system comprising;

first means for adjusting a gear ratio advance of the main transmission, said gear ratio advance corresponding to a gear ratio change during the shift operation;

second means for adjusting a gear ratio advance of the subtransmission, said gear ratio advance corresponding to a gear ratio change during the shift operation; and means for controlling said first adjusting means and said second adjusting means during concurrent shift operations of the main transmission and the subtransmission so that the gear ratio advances of the main transmission and the subtransmission become equal to respective predetermined target gear ratio advances.

2. A control system as recited in claim 1 wherein the gear ratio advance of whichever of the main transmission and the subtransmission which has the larger rate of the gear ratio advance in an initial part of the shift operation of the main transmission and the subtransmission is made larger than that of the other.

3. A control system as recited in claim 1 further comprising means for detecting engine load, and means for adjusting the gear ratio advances in accordance with the dectected engine load.

4. A control system as recited in claim 1 further comprising means for detecting engine torque, and means for adjusting the gear ratio advance in accordance with the dectected engine torque.

5. A control system as recited in claim 1 further comprising means for detecting a ratio between the ratio of gear ratios in the main transmission and the ratio of gear ratios in the subtransmission, and means for adjusting the gear ratio advances in accordance with the detected ratio.

6. A control system as recited in claim 1 wherein each shift operation is carried out in an initial region, an intermediate region and a final region, the shift operation of both the main transmission and the subtransmission being carried out in the intermediate region, and the shift operation of the main transmission being carried out in the initial region and the final region.

7. A control system as recited in claim 1 wherein said predetermined target gear ratio advances are adjusted based on an accelerator opening.

8. A control system as recited in claim 1 wherein said predetermined target gear ratio advances are adjusted based on an altitude at which a vehicle runs.

9. A control system as recited in claim 1 wherein said predetermined target gear ratio advances are adjusted based on an operating condition of an air conditioner.

10. A control system as recited in claim 1 wherein said predetermined target gear ratio advances are adjusted based on the kind of gasoline a vehicle is running on.

* * * * *